United States Patent [19]

van Olst

[11] Patent Number: 4,545,398
[45] Date of Patent: Oct. 8, 1985

[54] VENTING DEVICE

[76] Inventor: Gijsbrecht H. J. van Olst, 31 van Marnixlaan, 3818 VA Amersfoort, Netherlands

[21] Appl. No.: 469,871

[22] Filed: Feb. 25, 1983

[30] Foreign Application Priority Data

Feb. 26, 1982 [NL] Netherlands .................. 8200799

[51] Int. Cl.⁴ .............................................. E03C 1/295
[52] U.S. Cl. .................... 137/216.2; 137/217; 137/526; 137/859
[58] Field of Search ............. 137/216.2, 217, 218, 137/247.35, 526, 852, 859

[56] References Cited

U.S. PATENT DOCUMENTS

| 208,379 | 9/1878 | Downey | 137/216.2 X |
|---|---|---|---|
| 2,033,467 | 3/1936 | Groeniger | 137/217 |
| 2,511,435 | 6/1950 | Griswold | 137/526 X |
| 2,542,254 | 2/1951 | Lamb | 137/859 X |
| 2,722,943 | 11/1955 | Reinecke | 137/217 |
| 3,207,171 | 9/1965 | Kryman | 137/218 |
| 3,923,081 | 12/1975 | Persson | 137/217 |
| 4,117,856 | 10/1978 | Carlson | 137/218 X |
| 4,212,314 | 7/1980 | Ericson | 137/216.2 |
| 4,232,706 | 11/1980 | Ericson | 137/216.2 X |

FOREIGN PATENT DOCUMENTS

| 527941 | 1/1957 | Belgium | 137/216.2 |
| 875034 | 8/1961 | United Kingdom | 137/218 |

Primary Examiner—Gerald A. Michalsky
Attorney, Agent, or Firm—Flynn, Thiel, Boutell & Tanis

[57] ABSTRACT

A venting device for sanitary conduits comprising a first edge 12 and a second edge 10 bounding an air passage 7. One side of a valve 8 of flexible material is retained on the upper side of first edge 12, the other side provided with a downwardly extending ledge 13 moveably engages the top 15 of second edge 10. The valve 8 is provided with a thinned portion 9 near the first edge 12.

2 Claims, 3 Drawing Figures

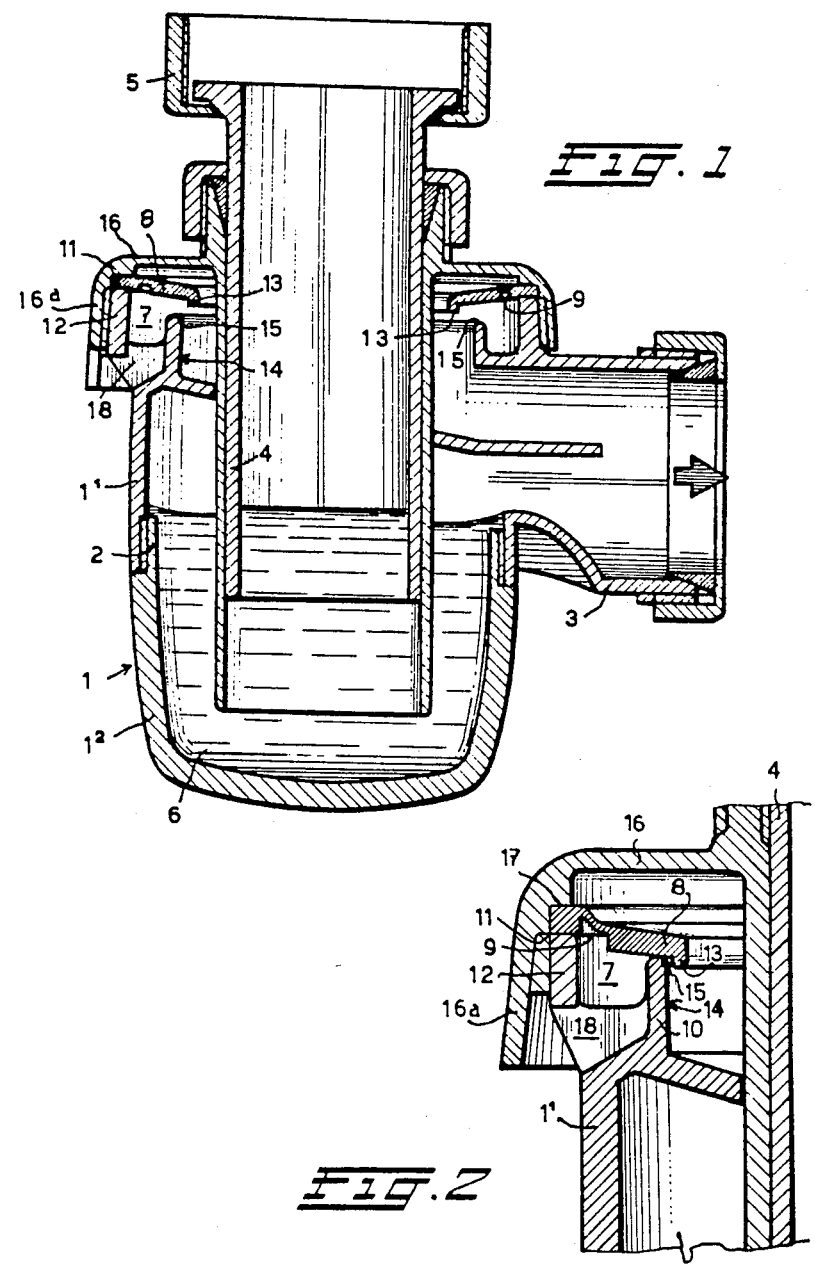

VENTING DEVICE

BACKGROUND OF THE INVENTION

1. Field of the Invention

The present invention relates to a venting device for sanitary conduits comprising an air inlet and destined to prevent in buildings an escape of gases from a conduit for used water to the ambiance, and comprising a displaceable valve being able to abut sealingly against a seat, said seat being formed by a second and a first edge of an air passage between a conduit for used water and the ambiance.

2. Description of the Prior Art

An automatic venting device of this type for sanitary conduits adapted to discharge used water and destined in houses or buildings to cause on the one hand ambient air to flow into conduits at the event of an underpressure; and on the other hand to prevent the escape of contaminated air via the air inlet at the event of an overpressure or a regulated pressure in the conduits, is known from German Offenlegungsschrift No. 28 38 111 and No. 28 38 068.

Said known automatic venting device exhibits the disadvantage that the seal of the displaceable valve upon the seat is often rather inappropriate so that evil smelling gases may easily escape to the outside from the discharge conduits for used water. This inconvenience gets the worse in that pollutions such as dust particles, may contaminate the edge of the air inlet, engaging the displaceable valve, thus causing an insufficient seal between said edge and the displaceable valve, in the course of time.

On the other hand, said valve cannot be removed from the seat in a sufficiently rapid manner at the event of an underpressure in the conduit for the discharge of used water, so that the known disadvantage of noise cannot sufficiently be obviated at the occurence of an underpressure in the discharge conduit.

SUMMARY OF THE INVENTION

It is a primary object of the present invention to provide an improved automatic venting device of the abovementioned type, which does not suffer from these disadvantages.

This object is attained according to the invention in that the valve of flexible material is retained upon a first edge and the freely moveable other side of the valve is able to adjoin the second edge sealingly.

When employing a valve of the above construction the aforementioned disadvantages will not occur while, moreover, the flexible valve will move over the top of the second edge at the occurence of an overpressure in the conduit, so that dust particles, if any, will be removed.

It has been found that at the event of an underpressure in the conduit, the use of a valve fixed in this manner, will provide an optimum venting without any evil smelling gases escaping at the event of an overpressure in the conduit.

The valve is very advantageously provided with a thinned portion, so that on the one hand a relatively thick valve to obtain a very good seal can be used which valve has on the other hand an optimum flexibility, thus being able to adjoin the second edge to obtain an optimum seal.

The presence of the thinned portion also improves the flexibility of the valve so that an easy displacement over the top of the second edge can be effected at the event of an overpressure and the said top can be kept perfectly clean without the presence of any contaminations or dust particles.

The valve is advantageously fixed upon an edge by means of a fixing member, so that the valve can be fixed in the automatic venting device in a very cheap manner.

The freely moveable edge part of the valve is preferably provided with a member bounding a displacement of the valve so that, at the occurence of an extremely great overpressure in the conduit, said valve cannot be displaced over the top of the second edge thus causing the entire sealing of the venting device to get lost, notwithstanding the very good flexibility of the valve due to the presence of the thinned portion.

The member bounding the displacement of the valve very advantageously consists of a ledge directed towards the inside of the second edge.

The valve preferably consists of flexible material, such as a natural or a synthetic rubber.

DESCRIPTION OF THE DRAWINGS

FIG. 1 is an automatic venting device in a syphon according to the invention:

FIG. 2 is a detail of the venting device of FIG. 1;

DESCRIPTION OF THE PREFERRED EMBODIMENTS

Figure 3:
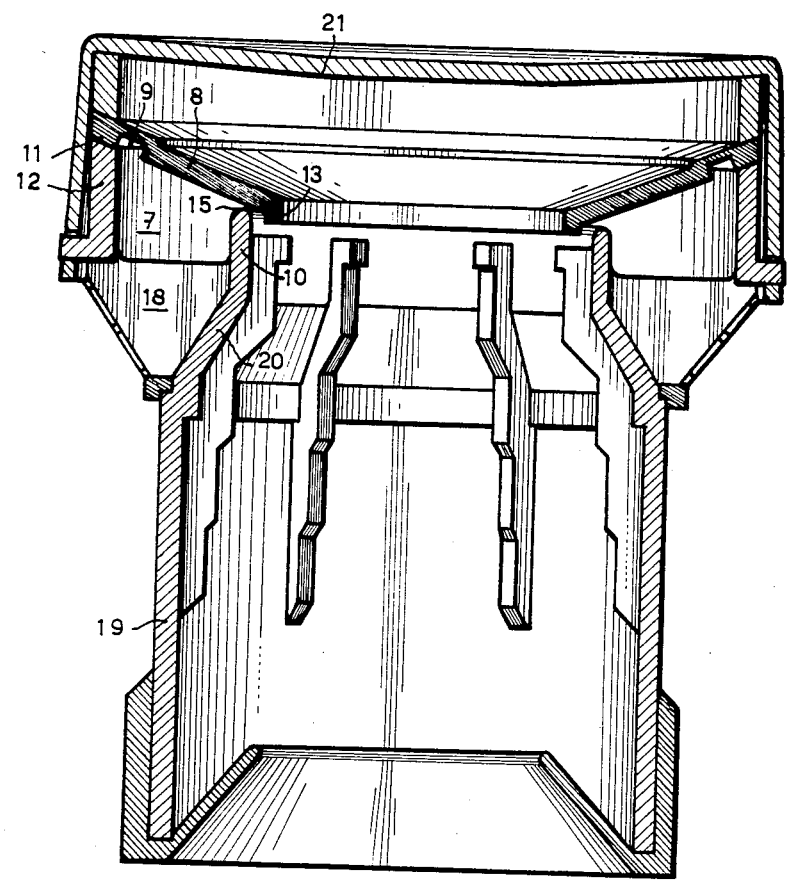
FIG. 3 is a venting system for a hydraulic installation.

FIG. 1 shows a syphon consisting of a cylindrical body comprising a first and a second cylindrical part $1^1$, $1^2$, being mutually connected at point 2 by screws and connected to the main through a pipe 3. Parts $1^1$ and $1^2$ consist of plastics.

A pipe 4 connected to a sink or wash-stand 5 of the like projects from the cylindrical body. A water lock 6 prevents the escape of evil smelling gases from the conduit for used water.

The top end of the device comprises an annular air passage 7 being on the one hand bounded by a cylindrical second edge 10 embracing an inner wall 14 and an upper surface 15.

On the other hand the air passage is bounded by a cover 16 comprising an annular skirt 16a.

The circumferential edge of a flexible valve 8 of rubber is fixed between the inner side 17 of the cover 16 and the top 11 of a first edge 12 being integral with the first part $1^1$.

In FIG. 1 said valve 8 allows the air passage 7 to be open whilst FIG. 2 shows the situation of an overpressure prevailing in the inner side of conduit 3, so that valve 8 is pressed sealingly upon upper surface 15 of the second edge 10 while deforming valve 8 of deformable material. An optimum seal of valve 8 is obtained by a thinned portion 9 provided in the area adjacent the edge portion of valve 8, and clamped between the top 11 of the first edge 12 and the inner side 17 of cover 16.

This thinned portion 9 preferably extending over the entire circumference provides an optimum seal of the valve 8.

To prevent the outer edge of the displaceable part of valve 8 to be pressed over the top 15 of edge 10 at the event of a too great overpressure in conduit 3, the freely displaceable edge part of the valve comprises member 13 in the form of an annular ledge for bounding a valve displacement, which ledge is integral with the valve.

Due to the use of said shoulder 13 directed towards the inner side 14 of the second cylindrical edge 10, the edge part of valve 8 cannot possibly be pressed over the top of the second edge 10 at the event of very high overpressures in conduit 3, so that an optimum seal is maintained.

In order to obtain a good engagement of valve 8 and top 15 of the second edge 10, the top 15 of the second edge 10 preferably has a rounded shape. Said rounded shape even prevents noise in the case that ambient air flows inwardly along the second edge 10, which noise would be audible when said top side 15 would have a non-rounded shape.

Valve 8 is preferably slopingly postured whilst the clamped edge portion and the top side 15 of the second edge have a normal position. Drops of water falling upon the valve will therefore easily disappear, due to the inclined position of valve 8.

The openings between the lands 18 of the air passage 7 are advantageously closed by a filter, e.g. for insects.

FIG. 3 shows a vertical pipe 19 connected to a venting channel (not shown), its upper end provided with a Venturi-shaped narrowing consisting of a truncated conical collar 20, terminating in a second edge 10 and co-operating with a cover 21 through a first edge 12 in such a manner, that the annular air inlet 7 extending along the circumference is formed. Said annular air inlet extending along the circumference can be sealed off by an annular valve 8 which is being retained upon the top side 11 of the first edge 11. The remaining reference numerals are the same as in FIG. 1.

What is claimed is:

1. A venting device for preventing escape of gases from used water sanitary conduits to the ambiance in buildings, comprising:
   a used water conduit including a downwardly extending used water inlet pipe, a hollow body, and a used water outlet pipe open to the interior of said hollow body and extending laterally therefrom, said outlet pipe being spaced above the bottom of said hollow body, said inlet pipe extending downward through the top of said hollow body to a point near the bottom thereof and below said outlet pipe, said hollow body forming a water seal vertically between the bottom of said inlet pipe and the outlet pipe spaced thereabove to prevent reverse passage of gases from the outlet pipe to the inlet pipe, said water seal being annular and radially defined by the annular space between the inlet pipe and the surrounding hollow body;
   a valve seat comprising annular coaxial upward facing radially outer and inner seat edges incorporated in said body near the top thereof, said radially inner seat edge being spaced between said outer seat edge and said used water inlet pipe, said hollow body having a top through which said used water inlet pipe downwardly extends, which top overlies said seat edges and with said seat edges defines an annular air passage communicating from the ambiance outside said hollow body, upward between said outer and inner seat edges, radially inward beneath said top and above said radially inner seat edge and downward between said inner seat edge and said inlet pipe to the interior of said hollow body adjacent said used water outlet pipe;
   means sealing said top to said water inlet pipe and thereby closing said top in the area above said upward facing inner and outer seat edges, said radially outer upward facing seat edge being spaced above said radially inner upward facing seat edge, the top of the radially inner seat edge being rounded;
   an annular valve member of flexible material having a radially outer edge portion sealingly fixed upon said radially outer seat edge, said annular valve member having an annular reduced thickness portion immediately adjacent said radially outer seat, to flexibly hinge the major, radially inwardly extending portion of the valve member and facilitate its rise from and fall downward to the upward facing radially inner seat edge, said annular valve member having a depending annular ledge at its radially inner edge, said ledge being located radially inward of said radially inner upward facing seat edge for hooking thereonto and preventing forcing of the radially inner edge of the annular valve member downward below the top of the radially inner seat edge due to excessive overpressure in the outlet pipe, said radially inner edge of said annular valve member being spaced radially outward from said inlet pipe and therewith defining therebetween an annular passage, a closed annular space overlying said air passage and being bounded by said top and said valve member and said used water inlet pipe, said annular space between said inlet pipe and said valve member ledge communicating between said closed annular space and the lower portion of the interior of said body.

2. The apparatus of claim 1 including a baffle extending laterally across the interior of said body vertically between said radially inner seat edge and water seal, said baffle protruding into said outlet pipe intermediate the top and bottom of the latter, said baffle separating said water seal from said air passage.

* * * * *